United States Patent [19]

Ballard

[11] 3,867,963
[45] Feb. 25, 1975

[54] PULSATION REDUCER

[76] Inventor: Allan Ballard, 1552 Balena Ave., Ottawa, Ontario, Canada K1G OX3

[22] Filed: Feb. 6, 1973

[21] Appl. No.: 330,020

[30] Foreign Application Priority Data
Nov. 14, 1972  Canada.............................. 156304

[52] U.S. Cl..................... 138/46, 137/568, 138/45, 251/75
[51] Int. Cl............................ F15d 1/02, F17d 1/10
[58] Field of Search............. 138/37, 31, 43, 44, 30, 138/46; 137/568; 251/75

[56] References Cited
UNITED STATES PATENTS

| | | | |
|---|---|---|---|
| 2,290,337 | 7/1942 | Knauth | 138/30 |
| 3,168,907 | 2/1965 | Mercier et al. | 138/30 |
| 3,383,084 | 5/1968 | Mayfield | 251/75 |
| 3,487,855 | 1/1970 | Lautenberger, Jr. | 138/31 |
| 3,559,945 | 2/1971 | Coiner | 251/75 X |

Primary Examiner—Richard C. Queisser
Assistant Examiner—Daniel M. Yasich

[57] ABSTRACT

A pulsation reducer for smoothing out the flow from the output of a positive displacement pump consists of one or more Belleville springs having a piston plate to cover the centre hole of the Belleville spring set into one or more openings in a fluid container. Means is provided to hold the Belleville springs in the openings with the apex side of the Belleville spring extending into the opening. A fluid sealing elastomeric diaphragm is disposed over the piston plate, and the Belleville spring in sealing relationship with the opening in the body of the fluid container. The Belleville springs deflect outwardly responsive to fluid pressure within the container, and fluctuations in pressure within the container cause variations in the deflection of the Belleville spring thereby providing a variable volume within the pulsation reducer.

11 Claims, 9 Drawing Figures

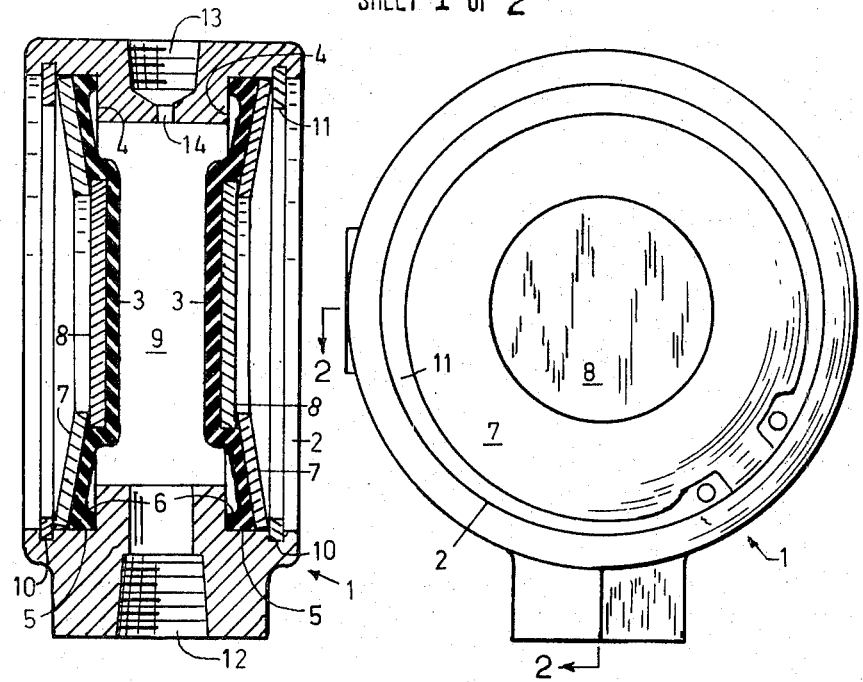

PULSATION REDUCER

BACKGROUND OF INVENTION

This invention relates generally to pulsation reducers and more particularly to pulsation reducers for use in applications such as positive displacement fluid pumps and is intended to reduce impact loading on valves, fluid conduit pump bearings, pump drives, piston seals, on piston type pumps, and gear teeth and seals and housings of gear pumps etc.

Small high pressure positive displacement pumps particularly of the type that are often used in spray wash machines for example that disclosed in U.S. Pat. No. 3,238,890 are often driven directly by an 1,800 rpm electric motor, and utilize two opposed pistons, thus 3,600 cycles per minute of pressure impulses and flow variations must be accomodated. If no pulsation reducer is used the whole pressure system is subject to impact loading (water hammer) at that frequency so that a pump delivering an average pressure of 500 p.s.i. can, depending on the resiliency of the piping, hose, etc., be subject to very great pressure variations a condition which is very damaging to pumps and flexible hose etc.

PRIOR PRACTICE

To improve the life of such pumps and associated fluid conduit systems pulsation reducers or accumulators which use gas as a spring medium have been used, however, such pulsation reducers tend to be large and require frequent servicing, and/or require a source of high pressure gas for re-charging: they are also expensive, and difficult, or impossible to repair or recondition.

OBJECTS

To provide a pulsation reducer which provides a high degree of attenuation within a desired pressure range.

To provide a pulsation reducer which utilizes the deflection characteristics of a Belleville spring having its centre hole covered by a plate, and supported against axial movement at its outer periphery and sealed to prevent leakage, to provide a variable volume to accomodate variations in the rate of flow of fluid under pressure.

To provide a pulsation reducer which achieves attenuation of liquid from a pulsating source by providing springs which support a flexible portion of the pulsation reducer which responsive to increase pressure within the pulsation reducer deflects outwardly to increase its volume, and vice-versa.

To provide a pulsation reducer whose working pressure can be changed by exchanging the spring elements.

To provide a pulsation reducer which can be serviced in situ.

To provide a pulsation reducer which has no sliding fluid seals and which does not require gas either for charging or replenishing.

To provide a pulsation reducer which is inexpensive to manufacture is easily assembled and economical to service and maintain.

To provide a pulsation reducer which can be constructed or assembled in series with restricting orifices to achieve a high degree of attenuation over a wide range of pressures.

To provide a pulsation reducer utilizing Belleville springs which utilizes deflection of the Belleville spring to actuate a pressure limiting valve.

PRINCIPLE OF OPERATION

My invention uses one or more Belleville springs which, together with a centre plate or piston which covers the hole in the Belleville spring constitute a resilient wall structure to support an elastomeric diaphragm which extends over the piston and the Belleville spring or springs and engages an inner body portion of my pulsation reducer in fluid sealing relation. The inner surface of the diaphragm acts as a fluid barrier to contain fluid within the body portion of my pulsation reducer. One or more such fluid barrier assemblies are provided in my pulsation reducer.

On being subjected to pressure the elastomeric diaphragm presses against the Belleville spring and piston assembly, the outer periphery of which is supported by suitable means against axial movement, and deflects the Belleville spring outwardly.

The Belleville spring size, thickness and free cone height are chosen to give a desired load deflection characteristic. For technical details of Belleville Spring design and characteristics reference is made to Transactions of the American Society of Mechanical Engineers, May 1936, Volume 58 No. 4 for derivations of appropriate Belleville Spring Data in a paper by Almen and Laszlo.

If the ratio of the free height $h$, of the cone, to the thickness, $t$, of the Belleville spring is greater than about 0.4 i.e. $h/t > 0.4$ the deflection vs. load characteristics will not be linear, and as $h/t$ approaches 1.41 the load vs. deflection curve for a Belleville spring "flattens out" and again raises so that within a limited range of deflection within the "flattened out" range above referred to, deflection can be varied with little if any change in applied load, deflection beyond the flattened out range requires increasing load.

If the Belleville spring is selected to that the working pressure within my pulsation reducer applies a load to the spring at the flattened out portion of the afore described curve, substantial variation in deflection of the Belleville spring or springs, and thus in the volume of the fluid contained within my pulsation reducer can be made with little change in pressure, and ideally with only enough pressure to overcome internal friction within the Belleville spring, the elastomeric diaphragm, and friction due to the miniscule radial movement of the Belleville spring as it contracts relative to the plate, and inertia of the masses of the assembly.

However, as a range of working pressures are required to accomodate slight differences in pump sizes and wear as well as variations in orifice size for example it is more practical to select Belleville springs having an $h/t$ ratio less than 1.41 but greater than 0.6 so that within a working pressure nominally of 500 p.s.i. a cyclical variation of 5 to 10% in pressure is required to deflect the Belleville spring assembly black and forth to the extent necessary to attain the required attenuation.

The effect attained by selecting Belleville springs which are deflected to the extent and within the range proposed above is comparable to providing a large air chamber to attenuate a pump having a small displacement, or providing an accumulator charged with gas pressure to just under the mean working pressure of the pump.

DESCRIPTION OF PREFERRED EMBODIMENTS

In the drawings wherein like numerals refer to like parts wherever they occur:

FIG. 1 is an end view of a double ended pulsation reducer;

FIG. 2 is a sectional view of a pulsation reducer taken along the line 2—2 of FIG. 1 illustrating a single stage embodiment;

FIG. 3 is a sectional view also on line 2—2 of FIG. 1 illustrating an alternative pulsation reducer provided with a two compartments interconnected by a flow restricting orifice;

FIG. 4 is an end view of a two concentric Belleville springs and plate assembly or resilient wall structure; and FIG. 5 is a section view of the concentric Belleville spring and plate assembly taken along line 5—5 of FIG. 4.

Figure 8:
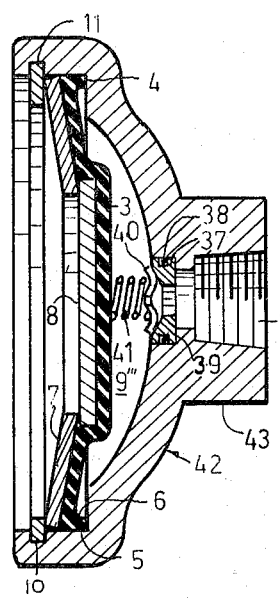
FIG. 8 is a sectional view of a single stage pulsation reducer taken on line 8—8 of FIG. 9.

In accordance with my invention a pulsation reducer 1 includes one or more openings 2 in a retainer body 9 to receive a pre-formed elastomeric diaphragm 3 seated in abutting axial relation against a shoulder 4, and in sealing contact against a perimeter portion 5 of the openings 2. The inner surface of the diaphragm 3 provides a fluid barrier to retain fluid within the pulsation reducer 1, and internal pressure within the body 9 tends to increase the sealing effect of the peripheral portions 6 of the diaphragms 3 against the perimeter portions 5 of the openings 2. A Belleville spring 7 is seated in the opening 2 with the apex side of the Belleville cone directed inwardly, a generally circular cover plate 8 having means to retain it concentric with the Belleville spring 7 is disposed in engagement with the inner surface of the Belleville spring 7 so that the outer surface of the diaphragm 3 bears against the inner surface of the Belleville spring 7 and the cover plate 8. An annular spring 11 (Circlip R) is disposed in a grooves 10 in the openings 2 and bears against the outer peripheral edge of the Belleville spring 7 and holds the outer peripheral edge axially fixed when fluid pressure is exerted within the pulsation reducer 1.

On being subjected to internal fluid pressure the diaphragm 3 presses against the cover plate 8 and the Belleville spring 7 causing deflection of the Belleville spring 7.

The Belleville spring 7 will deflect outwardly to a mean position and will oscillate in and out relative to the mean position, in responsive to variations in the fluid pressure. While the elastomeric diaphragm 3 deflects to accommodate relative pivoting motion between the Belleville springs 7 and the openings 2, and also between the Belleville springs 7 and the cover plate 8.

The pulsation reducer may be provided with one threaded inlet 12, and one or more outlets 13. If no outlets 13 are provided my pulsation reducer functions as an accumulator with ingress and egress of fluid through the inlet 12, however I prefer to provide one or more outlets 13 to permit fluid to flow through my pulsation reducer without reversing the direction of flow in the inlet 12.

To increase the range of pressure over which my pulsation reducer may be used I may provide a flow restricting orifice 14 in the outlet. To further increase the pressure and/or inhance pressure attenuation I may provide a multi-stage pulsation reducer as illustrated in FIG. 3 by dividing the pulsation reducer 1 into two fluid chambers 9 by a rigid divider 15. A suitably proportioned flow restricting orifice 16 in the divider 15 provides a flow path through therethrough to interconnect the fluid chambers 9.

With this arrangement the Belleville springs deflect somewhat out of phase with each other thereby further attenuating flow of fluid through the pulsation reducer.

It should be understood that there is a greater pressure drop across a pulsation reducer which uses flow restrictors and that if Belleville Springs can be matched to the working pressure exactly little advantage can be ahcieved with any flow restriction in the outlet, and that while I have shown flow restricting orifice 14 in the outlet of FIG. 2 such a restriction is not necessary or even desirable where it is possible to match the rate of the Belleville springs of my pulsation reducer to the working pressure and flow rate of the fluid being attenuated.

While I have illustrated a two stage pulsation reducer it should be understood that pulsation reducers having more than two stages may be constructed for special uses such as for example providing attenuation for high pressure fluid gauges of the Borden tube type.

Various arrangements of Belleville springs may be utilized. In the embodiments illustrated in FIGS. 2 and 3 single Belleville springs and cover plates are held in position by a pre-formed elastomeric diaphragm 3. FIGS. 4 and 5 illustrate an alternative form which uses two concentric nested Belleville springs 17 and 18 with a cover plate 19 all held in assembled relation by a stepped disc 20 secured as by a spot weld 21 between the cover plate 19 and the stepped disc 20. Obviously more than two nested Belleville springs can be arranged in analogous manner to achieve greater flexibility of design.

The principal reason for resorting to nested concentric arrangements of Belleville springs is to permit greater volume displacement for the same outer diameter with less maximum stress in the Belleville springs for a given pressure variation, and to reduce the loading stress between the Belleville springs 7 and the cover plate 8.

Many structural variations may be resorted to modify the function and use to which my pulsation reducer may be put, for example, a pressure limitation valve, either directly pressure actuated, or indirectly actuated by an adjustable lost motion linkage, which unseats a spring biases valve plunger responsive to movement of one or more Belleville springs, may be incorporated into the body of my pulsation reducer, to permit return of over pressure fluid through a suitable conduit to the intake of the pump. Or an unloading valve may be attached by suitable means such as a thread connection in the body of my pulsation reducer to permit return flow of fluid to the intake side of the pump.

Figure 6:
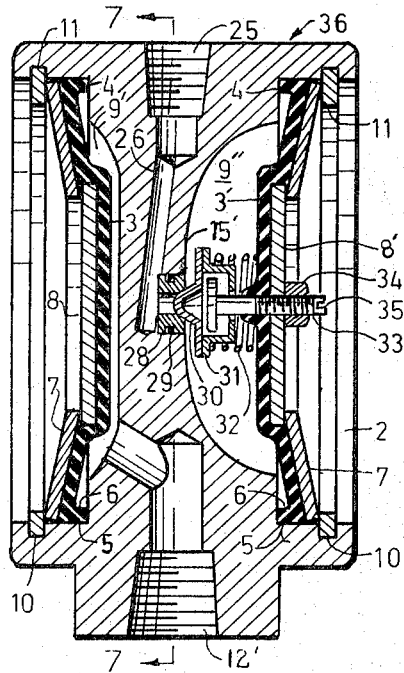
FIG. 6 is a sectional view of an alternative form of pulsation reducer incorporating a pressure limiting valve within its body taken on line 2—2 of FIG. 1.

The embodiment illustrated by way of example in FIG. 6 and generally designated 36 utilizes deflection of a Belleville spring 7 to unseat a plunger 30 seated in a valve seat 28 which may be suitably sealed as with an O-ring 29 in a mating socket 27 in the rigid divider 15'. Any suitable lost motion arrangement may be provided to permit a pre-determined deflection of the Belleville spring 7 to occur before the valve plunger 30 is lifted from the seat 28. A spring 32 bears against an elastomeric diaphragm 3' and against an apertured cap 31 which is fixed as by spot welding or soldering to the plunger 30. To effect unseating of the plunger 30 on over deflection of the Belleville spring 7. A headed adjustment bolt 33 having the head portion movably contained between the plunger 30 and the cap 31 extends through a suitable self sealing opening in the centre of the elastomeric diaphragm 3'. A threaded portion of the bolt 33 adjustably extends through a correspondingly threaded hole in the centre of cover plate 8'. The threaded end of the adjustment bolt is provided with a suitable adjustment slot 35, and a locking nut 34 provided on the outer end of adjustment bolt 33 is provided to secure the adjustment bolt in pre-determined adjustable position by jamming the locking nut 34 against the outisde surface of the plate 8'. Thus upon exceeding a pre-determined pressure, valve plunger 30 is unseated by engagement between the head of bolt 33 and the inside of cap 31.

Internal pressure within 9" together with force exerted by spring 32 are sufficient to effect sealing engagement between the plunger 30 and the seat 28 at pressures less than a pre-determined maximum pressure until plunger 30 is unseated.

Figure 7:
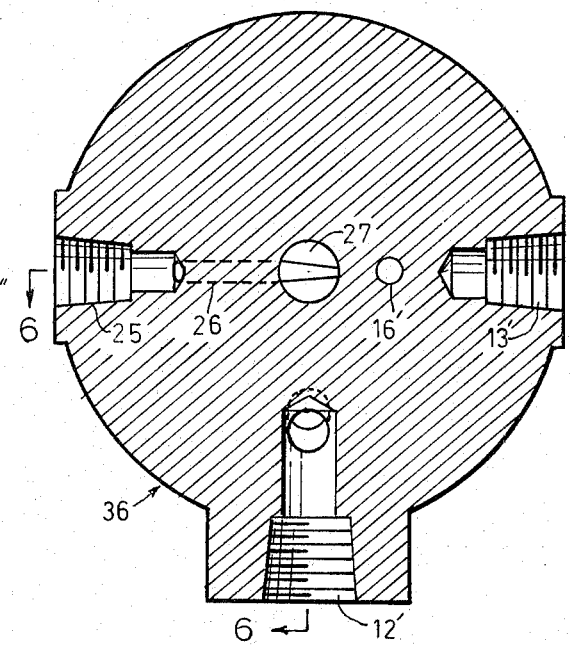
FIG. 7 is a sectional view taken on line 7—7 of FIG. 6 showing the location of inlet, outlet and return conduit connections for a pulsation reducer incorporating a pressure limiting valve.

For symmetry of forces and to provide space in the embodiment of FIG. 6 the over pressure relief valve is located on or near the axis of the Belleville springs 7 and therefore an interconnecting orifice 16' not shown in FIG. 6 has been shown in FIG. 7 to provide for fluid interconnection between fluid chambers 9' and 9" shown in FIG. 6. Thus at less than pre-determined pressure fluid enters the embodiment of FIGS. 6 and 7 through 12' passes through orifice 16' and exits through 13'. If pressure exceeds the pre-determined pressure sufficient fluid will pass through valve seat 28, return conduit 26 and return fitting 25 to prevent over deflection of the Belleville springs 7, and to allow fluid to be returned to the intake side of a pump as for example when the trigger of a spray wash gun is released.

Figure 9:
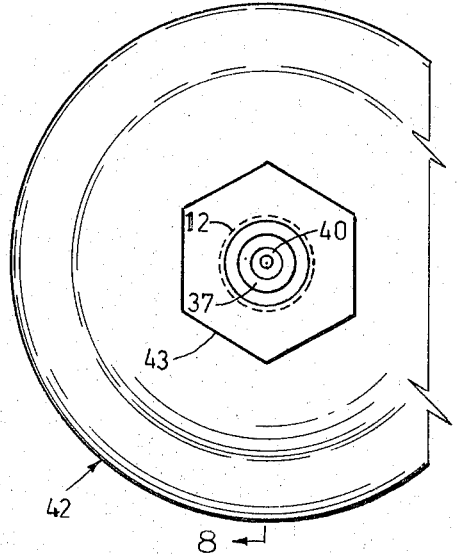
FIG. 9 is a fitting end view of a single stage pulsation reducer in accordance with this invention.

A single Belleville spring pulsation reducer illustrated in FIGS. 8 and 9 resorted to for economy of construction or to conserve space. This embodiment generally designated 42 may be provided with flats or a hexagon for a wrench for ease of installation. If a relatively constant pressure is to be attenuated and a Belleville spring is selected to match the pressure closely, i.e., a Belleville spring having an afore described flattened deflection curve within the range of deflection utilized, there should be as little resistance to inward and outward flow of fluid as possible, however, if a range of pressures is to be attenuated a Belleville spring having a greater range of working pressures may be used, and to improve damping of pulsations a flow restriction valve comprising a seat portion 37 suitably sealed as with an O ring 38 in a seat 39 in the body in communication between the inlet 12" and the pressure chamber 9''' is provided with an apertured poppet 40 held into the seat 39 by a spring 41 bearing against the elastomeric diaphragm 3, so that there is very little resistance to passage of fluid into the chamber 9''', but considerable resistance to passage of fluid out of chamber 9''' in reverse flow, thus damping of only that portion of the output of a reciprocating pump which enters the pulsation reducer is provided, and the rate at which fluid is returned by the pulsation reducer can be controlled by varying the area of the orifice in apertured poppet 40.

A suitable washer (not shown) may be provided on the outer side of the Belleville springs of my pulsation reducer either for decorative purposes, or to serve as a stop to prevent accidental over deflection of my Belleville springs.

Cast iron, cast formed, or forged steel suitably machined and coated to resist corrosion are preferred materials for the body of my pulsation reducer, and stainless steel or brass are preferred for springs, valves, parts and seats.

A plurality of my pulsation reducers may be placed in series or parallel relation to increase their attenuation capacity.

In place of an elastomeric diaphragm to effect a fluid tight seal O-rings of suitable elastomeric material have been used seated in suitable O-ring grooves in a stepped part of opening 2 (not shown) and in the outer peripheral region of the plate 8 (not shown) to bear directly against the Belleville springs 7. This arrangement has proven satisfactory, however, because of the need to use special materials to achieve protection from corrosion if O-rings are used I prefer to use a single piece preformed elastomeric diaphragm to separate the Belleville springs 7, or 17 and 18, the spring clip 11 as well as the plates 8 and 19 respectively from the fluid in the pulsation reducer.

Highly corrosive liquids can be attenuated in my pulsation reducer if the body portion is formed of stainless steel or alternatively the interior of my pulsation reducer may be lined with inert material such as epoxy resin, or the same elastomeric material of which my diaphragm 3 are formed.

Many variations in form structure and use of my pulsation reducer will readily occur to those skilled in the art. Therefore, it will be understood that I intend to cover by the appended claims all such variations which fall within the true spirit and scope of my invention.

I claim:

1. A resilient wall structure means for use in an apertured housing for reducing the intensity of pressure variations in a fluid system which is subject to pulsating fluid pressure comprising;

at least one generally resilient frusto-conically shaped apertured spring washer having its peripheral edge resiliently mounted in said apertured housing and having a convex side toward an internal portion of the housing, a plate means supported in aperture covering load bearing relation by inner portions of the convex side of said at least one apertured spring washer, and means operatively, interconnecting said at least one apertured spring washer and said plate means to retain said plate means generally concentric in said aperture covering relation against said at least one apertured spring washer, and to permit relative pivotal and radial movement therebetween on initial axial displacement and oscillation of said plate means under the influence of the pulsating fluid pressure and with respect to said peripheral edge of said at least one apertured spring washer.

2. A device as claimed in claim 1 wherein said means operatively interconnecting said at least one apertured spring washer and said plate means includes means extending through the aperture in said at least one apertured spring washer, and in engagement with inner portions of the concave side thereof.

3. A device as claimed in claim 1 wherein said means operatively interconnecting said at least one apertured spring washer and said plate means includes a disc in engagement with inner portions of the concave side of said at least one apertured spring washer.

4. A device as claimed in claim 3 wherein said disc is stepped to provide at least one shoulder which extends into the aperture of said at least one apertured spring washer, and is attached to said plate to secure said at least one apertured spring washer, said plate, and said disc together in concentric relation.

5. A device as claimed in claim 3 wherein a portion of at least one of said plate means or said disc extends into the aperture of said at least one said apertured spring washer to hold said cover plate and said at least one apertured spring washer together in generally concentric relation.

6. A device as claimed in claim 1 wherein said means operatively interconnecting said plate and said at least one apertured spring washer includes an elastomeric diaphragm molded to conform to the exposed surfaces on the convex side of said resilient wall structure to retain said plate and said at least one apertured spring washer generally concentric.

7. A device as claimed in claim 6 wherein said elastomeric diaphragm includes an axially extending sealing flange portion at its outer periphery for sealing engagement in an opening in said fluid system.

8. A device as claimed in claim 1 wherein said at least one apertured spring washer is a Belleville spring having a free height cone height to thickness ration within the range of 0.4 to 1.41.

9. A device for reducing the intensity of pressure variations in a fluid system which is subject to pulsating fluid pressure comprising:

a fluid containing body member having at least one fluid connection to permit fluid to flow in and out of said device, at least one resilient wall structure means disposed in an opening in said body member, said resilient wall structure including at least one resilient frustro-conically shaped apertured spring washer having its peripheral edge resiliently mounted in said opening in said body member, and having a convex side disposed toward an internal portion of the body member, a plate means supported in aperture covering load bearing relation by inner portions of the convex side of said at least one apertured spring washer, and means operatively interconnecting said at least one apertured spring washer and said plate means to retain said plate means generally concentric in said aperture covering relation against said at least one apertured spring washer, and sealing means disposed in sealing relation in said opening in said body member between said body member and said resilient wall structure to retain fluid within said body member, and means to secure the outer periphery of said resilient wall structure in fixed axial relation in said opening in said body member so that in use, said at least one resilient wall structure will deflect outwardly to a mean position, and oscillate in and out relative to the mean position, responsive to fluid pressure variations.

10. A device as claimed in claim 9 wherein said sealing means includes an elastomeric diaphragm disposed over the convex side of said at least one resilient wall structure.

11. A device as claimed in claim 9 wherein said fluid containing body member is provided with at least two axially opposed openings to receive said resilient wall structures so that on being subject to pressure variations, acceleration forces exerted on and by the opposed resilient wall structures are equal and opposite to thereby provide a dynamically balanced device.

* * * * *